(12) United States Patent
Rao

(10) Patent No.: US 7,398,077 B1
(45) Date of Patent: Jul. 8, 2008

(54) UNIVERSAL PREMISE CONTROLLER

(75) Inventor: Kashipati G. Rao, Plano, TX (US)

(73) Assignee: Alcatel Lucent, Paris (FR)

( * ) Notice: Subject to any disclaimer, the term of this patent is extended or adjusted under 35 U.S.C. 154(b) by 375 days.

(21) Appl. No.: 10/928,460

(22) Filed: Aug. 27, 2004

Related U.S. Application Data

(63) Continuation-in-part of application No. 10/317,447, filed on Dec. 12, 2002, now Pat. No. 7,110,763.

(51) Int. Cl.
*H04M 1/66* (2006.01)

(52) U.S. Cl. ............... 455/410; 455/411; 455/418; 455/419; 455/420

(58) Field of Classification Search ........... 455/410, 455/411, 418, 419, 420, 566, 557; 379/93.17, 379/90.01, 93.23; 709/217, 219
See application file for complete search history.

(56) References Cited

U.S. PATENT DOCUMENTS

2002/0080949 A1* 6/2002 Mikhailov et al. ......... 379/230
2002/0103850 A1* 8/2002 Moyer et al. .............. 709/202
2002/0163504 A1* 11/2002 Pallakoff .................. 345/169
2003/0078990 A1   4/2003 Lee
2003/0088421 A1* 5/2003 Maes et al. ............. 704/270.1
2003/0189509 A1* 10/2003 Hayes et al. .............. 341/176
2003/0232593 A1* 12/2003 Wahlroos et al. ......... 455/3.05

FOREIGN PATENT DOCUMENTS

EP          1 278 338 A1     1/2002

* cited by examiner

*Primary Examiner*—Joseph Feild
*Assistant Examiner*—Huy D. Nguyen

(57) ABSTRACT

A remote (10) communicates with a graphical proxy server (12) over a network (14). The graphical proxy server (12) controls the user interface on the remote (10) responsive to user interaction with the remote (10). Responsive to actions taken with the user interface, the graphical proxy server sends commands to control various devices (17).

15 Claims, 5 Drawing Sheets

UNIVERSAL PREMISE CONTROLLER

CROSS-REFERENCE TO RELATED APPLICATIONS

This application is a continuation-in-part of U.S. Ser. No. 10/317,447 (Publication No. 2004/0114603), entitled "Graphical Proxy for Less Capable Terminals", filed Dec. 12, 2002

STATEMENT OF FEDERALLY SPONSORED RESEARCH OR DEVELOPMENT

Not Applicable

BACKGROUND OF THE INVENTION

1. Technical Field

This invention relates in general to electronic devices and, more particularly, to a universal premise controller for controlling appliances via a global network connection.

2. Description of the Related Art

Remote control of appliances, such as audio/visual equipment and garage doors, has become commonplace. Typically, each piece of equipment is supplied with its own remote control. Some remote controls are designed to work with other devices as well; for example, a stereo receiver remote control will sometimes come with a large number of codes that allow the user to program the remote to operate other devices, such as the television and an audio recording device. Seldom, however, does a remote control for one device satisfactorily control another device, without a large learning curve.

An alternative is the "universal" remote control. These remotes generally are of two types. The first type, a non-learning remote, is programmed with the remote codes for a large number of devices by a large number of manufacturers. The user selects the codes for the manufacturer of each device. The second type, a learning remote, includes the functionality of the non-learning remote, and additionally allows a user to program specific keys of the using the original manufacturer's remote.

More recently, programmable remotes have become available. Programmable remotes allow a user to program certain features of a remote using a computer. A user could, in some instances, program any key to output any remote code. Some expensive remotes include a graphical display where a user may provide graphics to be associated with a function; these graphics can be generated by the user or selected from existing graphic icons. A programmable remote give the users more control over the functionality of the remote; however, programmable remotes require a large investment of time.

In the future, more appliances will be controlled remotely. Cooking devices, washing machines, security systems, and so on will all have the ability to be controlled remotely, either through a local wireless signal or through a direct or wireless connection to a global network, such as the Internet. As the number of controllable devices increases, the frustration with having multiple remotes, with multiple remote user interfaces, will similarly increase.

Accordingly, a need has arisen for a universal premise controller that can efficiently control multiple devices through a single interface.

BRIEF SUMMARY OF THE INVENTION

In the present invention, a remote control system comprises a digital network and an electronic processing device for communicating over the network with a graphical proxy server. The graphical proxy server generates user interfaces for the electronic processing device to controlling various devices. Responsive to messages from the electronic processing device indicating user interaction with a user interface, the graphical proxy server sends messages to control the various devices.

The present invention provides significant advantages over the prior art. A single device can be used for controlling multiple devices through the graphical proxy server, regardless of the location of the devices. Further, a user can know the state of various appliances regardless of his or her location. Alarms can be set up to inform the user if about any state that is not normal.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-8 of the drawings, like numerals being used for like elements of the various drawings.

Figure 1:
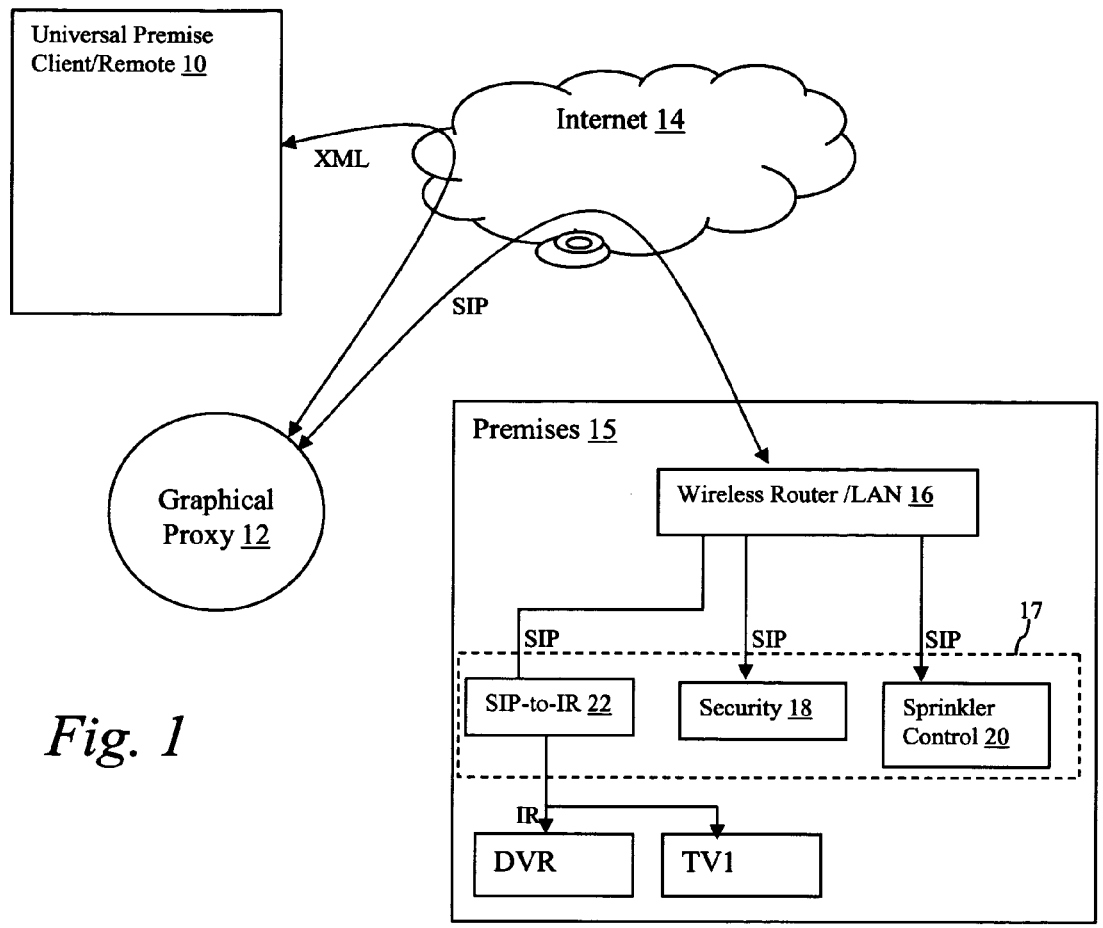
FIG. 1 illustrates a block diagram of the present invention using a graphical proxy to provide remote control services.

FIG. 1 illustrates a block diagram of the present invention using a graphical proxy to provide remote control services. A detailed description of an embodiment of the graphical proxy for use in telephony services is described in U.S. Pat. No. 6,775,362, entitled "Graphical Telephone System", filed Mar. 6, 2002, and U.S. Ser. No. 10/317,447 (Publication No. 2004/0114603), entitled "Graphical Proxy for Less Capable Terminals", filed Dec. 12, 2002, both of which are incorporated by reference herein.

In FIG. 1, the universal premise client/remote (hereinafter the remote) 10 is coupled to the graphical proxy 12 through a public/private network 14, such as the Internet. The graphical proxy 12 is also in communication with the premise(s) at which the controlling will occur; i.e., the graphical proxy 12 is in communication with each of the premises (for example, the home or workplace) that has devices to control. Distribution of signal within the controlled premises can be effected using a number of configurations. In FIG. 1, a wireless router 16 is shown as distributing signals from the graphical proxy 12 to a number of devices 17, such as a security system 18, sprinkler system controller 20 and a SIP-controlled IR/RF (infrared/radio frequency) transducer 22, using SIP (Session Initiation Protocol). Other protocols (such as MGCP and MEGACO) for controlling the devices could be used as well, and multiple protocols could be used in a single premise. The SIP-controlled IR/RF transducer 22 sends infrared or radio frequency signals to legacy devices which are otherwise controlled with standard IR or RF remote controls.

While a wireless router/LAN 16 is shown as distributing signals to the various devices, wired connections or a combination of wired and wireless connections could be used.

The remote 10 could be a dedicated remote, or one of any number of devices capable of making a network connection, such as a mobile phone, a personal digital assistant (PDA) with networking capabilities, or a personal computer. A person may use several different devices as the remote 10; for example, a personal computer may be used at work to remotely control devices at home, a dedicated remote with wireless network capabilities could be used at home to control devices at home and at work, and a PDA with cellular communications capability could be used when outside of home and office.

In the preferred embodiment, the remote 10 has a graphical display which is controlled by the graphical proxy 12, in the manner described in U.S. Pat. No. 6,775,362 and U.S. Ser. No. 10/317,447, referenced above. As the user interacts with the remote 10, XML (extended markup language) messages are sent between the remote 10 and graphical proxy 12. For example, when a user performs an operation on the remote, such a pressing a button or clicking an icon, an XML message indicating the performed operation is sent to the graphical proxy 12. In response to the performed operation, the graphical proxy can create graphical displays and send XML messages to the remote 10 to control the graphical interface of the remote and/or send SIP messages to one or more of the devices 17 to control their operation or to retrieve data from the devices.

To illustrate, the user may click on an icon on the remote 10, where the icon is associated with the bedroom television, indicating that he or she would like to control some aspect of the television. The action performed (click on bedroom television icon) is sent from the remote 10 to the graphical proxy 12. From the information sent to the graphical proxy 12 describing the action, the graphical proxy 12 determines that the user wants to display the controls for the bedroom television and sends the appropriate messages to display the interface for controlling this specific television. In the preferred embodiment, as described below, the graphical proxy 12 generates a web page with the desired graphical interface and then sends a URL (universal resource locator) address to the remote 10 in an XML message, where the URL address points to this web page. As described below, text associated with the graphical features of the web page is typically sent in an XML message and merged with the graphics. Typically, the web page includes code in a graphical language such as FLASH (by Macromedia), which enhances interaction with various graphical elements on the web page. As the user interacts with graphical elements on the web page, details on the user interaction are sent to the graphical proxy 12 for control of the bedroom television. For example, if the user were to press the "channel up" button, the remote 10 would send an XML message to the graphical proxy 12 indicating the action, the graphical proxy 12 would interpret the action and send a SIP message to increment the channel on the bedroom television. If the television were directly controllable by SIP commands, the "up channel" SIP message would be sent to directly to the television through router/LAN 16; otherwise, the SIP message could be directed to a SIP-controlled IR/RF transducer in proximity with the bedroom television, which would output an "up channel" code in an IR/RF signal.

Figure 2:
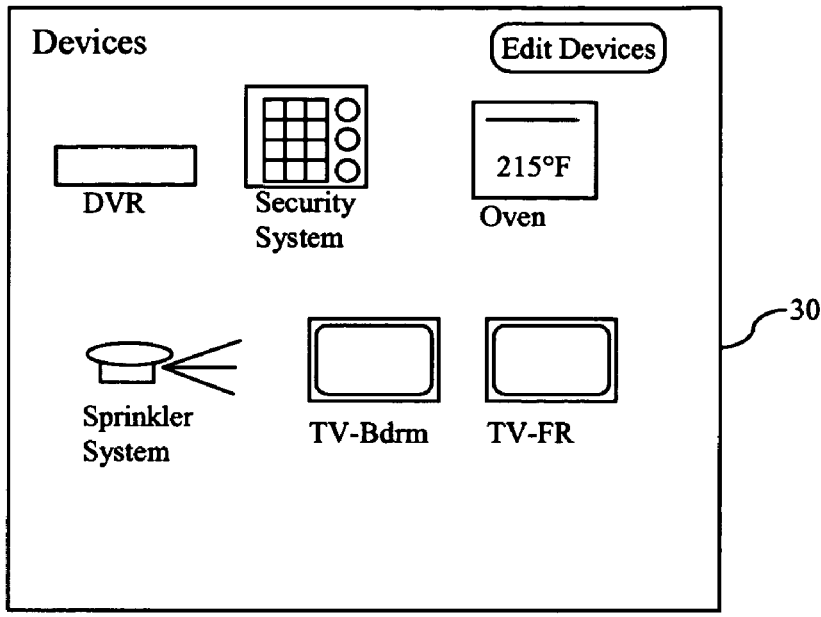
FIG. 2 illustrates a default display screen which could appear on the remote displaying the devices available for control.

FIG. 2 illustrates an initial display screen 30 which could appear on the remote 10 displaying the devices available for control. This screen shows icons for a number of devices—a DVR (digital video controller), a security system, an oven, a sprinkler system, a bedroom television and a family room television. An "edit devices" button is available for the user to add or remove devices from the screen. Information on the devices for a particular user is stored in a database accessible by the graphical proxy 12.

By manipulating the graphical information on the screen 30, the user can select a device to control. Once a device is selected, the graphical proxy 12 prepares a web site with graphical controls for controlling that particular device. An XML message is then sent to the remote 10 pointing to the web site.

Figure 3:
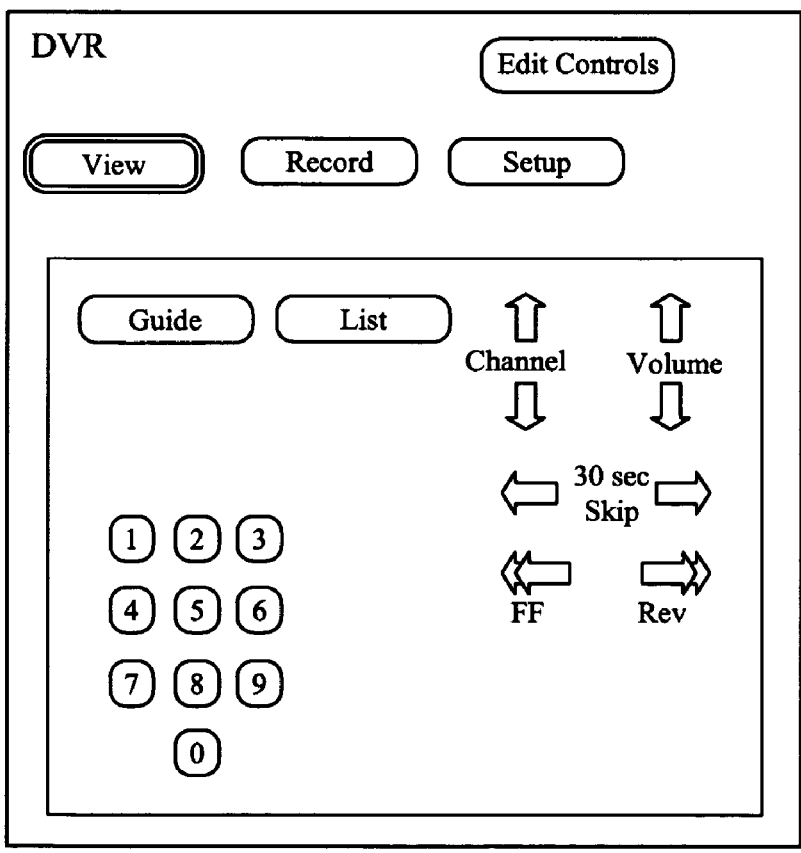
FIG. 3 illustrates a control screen for a digital video recorder.

FIG. 3 illustrates a control screen 32 for the DVR. In this instance, the DVR is controlled through multiple screens; the user can press one of three buttons ("view", "record" or "setup") to get to the desired screen. In FIG. 3, the "view" screen is shown. Within this screen, the user can select a channel guide, a list of recorded programs, channel up/down, volume up/down, numbers on a numeric keypad, a 30 second forward/reverse skip, fast forward or reverse. An actual embodiment would include other functions as well.

In response to user actions, the functions of the DVR could be controlled in the manner described above. In addition, the display could be used to control other devices associated with the DVR; for example, the volume up/down buttons could be set to change the volume on a specified television connected to the DVR.

Additionally, the graphical proxy 12 could control the user interface in different manners, depending upon the location of the user, which could be specified by the user or through inference responsive to an IP address assigned to the remote 10. For example, if the user was in the same location as the DVR (i.e., the user is at home and controlling a DVR located at home), pressing the channel guide would display a selection of channel on a television connected to the video output of the DVR. On the other hand, if the user was at work, using a television at home to display a channel guide (for example, to record a program) or a list of recorded programs would be of no benefit. Accordingly, if the graphical proxy determines that the user is not proximate the television coupled to the DVR, it could retrieve a channel guide or a recorded program listing from an internet site using a web browser. Some DVRs, such as those sold under the mark REPLAYTV, maintain a channel guide and recorded program listing for registered subscribers, so the remote 10 could open a window to receive this information from the web site. This mode could also be useful if the user was in the same premises (e.g., the home), but was not in view of the television. In this case the user could explicitly request the "off-site" mode.

In the preferred embodiment, some or all of the displays associated with different devices are customizable by the user, so that desired functions can be added and unused functions removed from various screens. Also, it would be possible to have a customizable screen (or multiple screens) with the most used controls for various devices. For example, a "home theater" screen could have volume controls which controlled the volume of an amplifier, fast forward and reverse controls to control a DVD player, and picture controls to control a high definition monitor.

Figure 4:
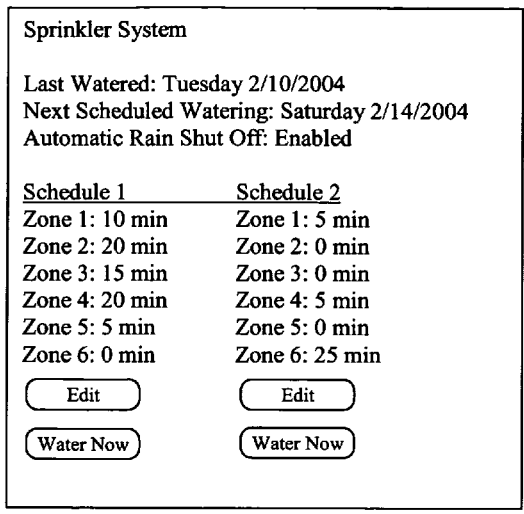
FIG. 4 illustrates a display for controlling a sprinkler system.

FIG. 4 illustrates a display 34 for controlling a sprinkler system. This screen shows various status information associated with the sprinkler system; it is assumed that this information is maintained in the sprinkler system controller. For example, information is provided indicating the day that the watering last occurred, the day of the next scheduled watering, and whether the automatic rain shut-off is enabled. Control information could be modified from this screen, such as the watering time for each zone. Also, immediate actions by the controller could be invoked, such as starting a cycle by clicking a "water now" button.

Figure 5A:
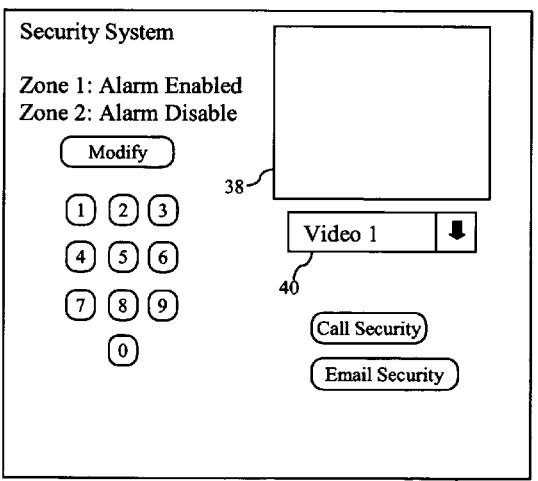
FIGS. 5a through 5b illustrate a displays for a security alarm.
Figure 5B:
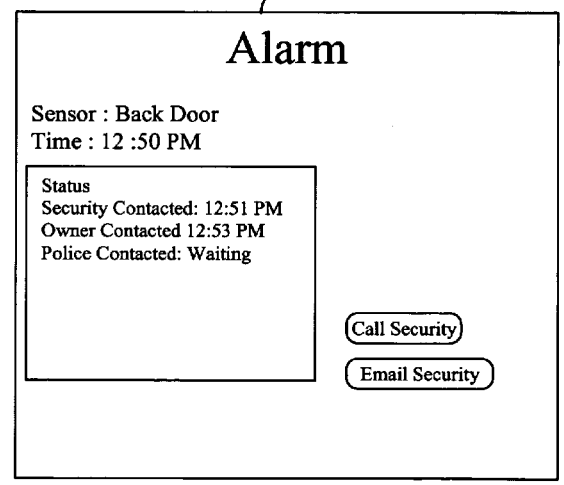

FIGS. 5a-b illustrate a displays for a security alarm. In FIG. 5a, a display 36 is shown which shows the current status of the alarm system—in this case "zone 1" is enabled and "zone 2" is disabled. The status of the zones could be changed by using the "modify" button and the keypad to enter the security code. In the illustrated case, a window 38 is opened to receive the output of a video camera capable of transmitting over the Internet. If multiple video cameras are available, the camera could be selected using the drop down box 40.

Two buttons allow the user to contact the security monitoring company—a "call security" button could be pressed to set up a call to the security company. The call could be completed using VOIP (voice over IP), if the remote 10 has such capability. An "email security" button would allow the user to send an email to the security company.

FIG. 5b illustrates a display 42 showing an alarm condition detected by the security system. In this case, the display on the remote is initiated by the device (the security system), which sends information to the graphical proxy 12. In response, the graphical proxy 12 sends an XML message to the remote 10 to display an alarm screen, along with relevant data such as the time and cause of the alarm, and the current status of events initiated by the alarm, such as contacting the police. The call security and email security would work as described above.

A preferred embodiment for the graphical proxy 12 is provided below. In the preferred embodiment, the graphical proxy 12 is also used for telephony—this aspect of the graphical proxy is provided in U.S. Pat. No. 6,775,362 and U.S. Ser. No. 10/317,447, referenced above.

Figure 6:
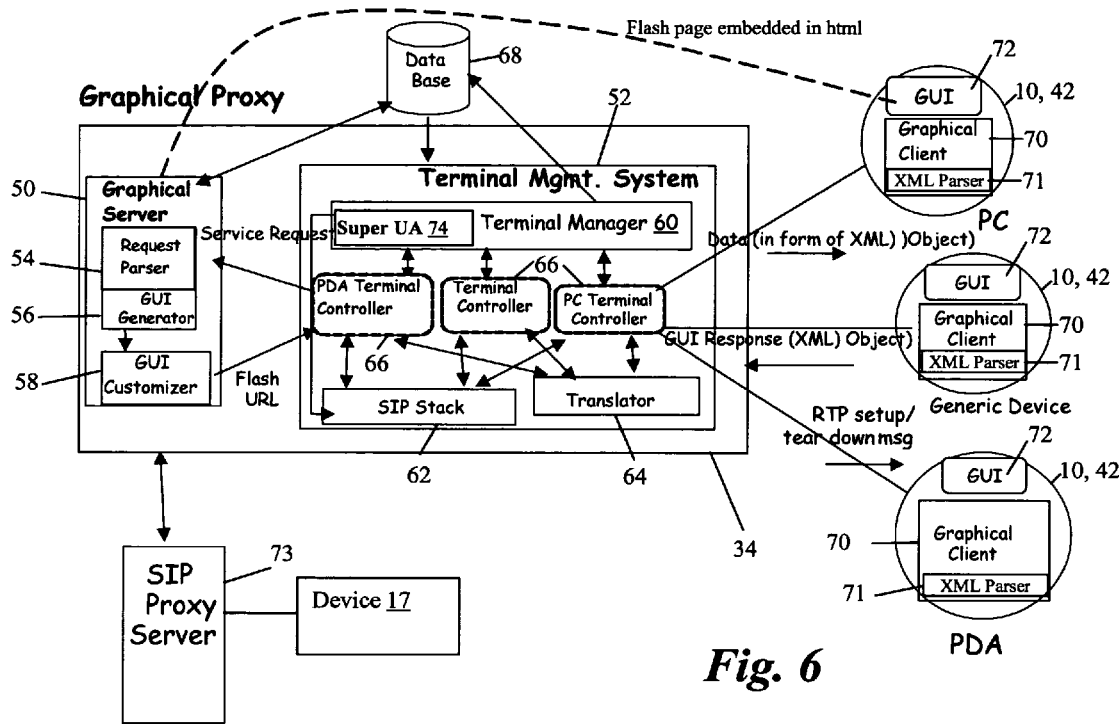
FIG. 6 illustrates a block diagram of a graphical proxy which supports a terminal that could be used for the type of remote described in FIG. 1.

FIG. 6 illustrates a block diagram of a graphical proxy 12 which supports a terminal that could be used for the type of remote described above. Importantly, the terminal does not need to have a client communication stack. FIG. 6 shows three different terminals 42 that could function as a remote 10, namely, a personal computer, a PDA and a generic computing device.

The graphical proxy 12 includes two major functional blocks, a graphical server 50 and a terminal management system 52. The graphical server 50 includes a request parser 54, a GUI generator 56 and a GUI customizer 58. The terminal management system 52 includes a terminal manager 60, a SIP stack 62, a translator 64, and multiple instances of terminal controllers 66, where each instance of a terminal controller 66 is associated with a respective graphical terminal 42. The graphical server 50 and the terminal management system 52 are in communication with a database 68. Each graphical terminal 42 includes graphical client software 70 (including parser 71) and GUI software 72.

The terminal management system 52 is responsible for registering the associated graphical terminals 42 with the graphical proxy 12 and then registering on behalf of each associated graphical terminal 42 with a SIP Proxy 73 (which could reside anywhere on the network 14). The terminal management system 52 handles the communication with each associated graphical terminal 42 and interacts with the graphical server 50 to provide a customized GUI for each graphical terminal 42.

The terminal manager 60 manages all the associated graphical terminals 42 for multiple users. When a user starts the FLASH client on a graphical terminal 42, the graphical terminal establishes a connection with the terminal manager 60. The terminal manager 60 then instantiates a terminal controller 66 for that graphical terminal 42 and maintains the mapping between the graphical terminal 42 and the respective terminal controller 66. The terminal manager 60 implements a Super user agent 74, which receives requests for connection for all terminals 42, identifies which terminal associated with the request, and then passes the request to the user agent 76 (see FIG. 7) in the terminal controller 66 for the particular terminal. The Super User Agent 74 is also responsible for registering each terminal 42 with a SIP Proxy server 73. To the SIP proxy server 73, the Super user agent 74 appears as the individual user agent for a terminal.

Figure 7:
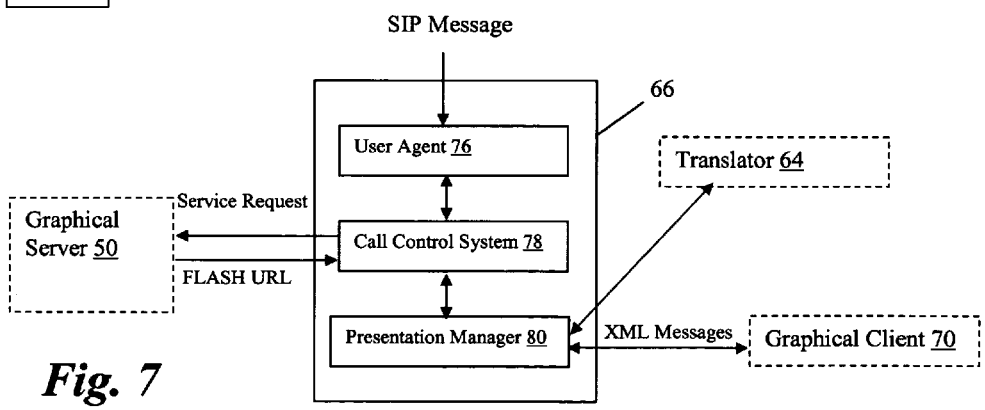
FIG. 7 shows different components of the terminal controller and their interaction with other components of the graphical proxy.

FIG. 7 shows different components of the terminal controller 66 and their interaction with other components of the graphical proxy 12. There is one terminal controller 66 instantiated for each terminal 42. Each terminal controller 66 includes a user agent 76, a call control system 78 and a presentation manager 80. The User agent 76 receives and sends SIP messages on behalf of the associated graphical terminal 42 (while the present invention is described in connection with the SIP protocol, the user agents 76 could support any available protocol, such as H.323, MGCP, MEGACO, any protocol developed in the future, or multiple protocols). The user agent 76 processes SIP requests and response messages coming to the terminal 42 and provides relevant information to the call control system 78. The user agent 76 also generates appropriate SIP requests and response messages based on the information it gets from the call control system 78 responsive to user responses.

The use of the Super user agent 64 is optional. By using a Super user agent 74 to receive and send SIP messages to the SIP proxy server, only a single port is needed to receive and send messages associated with all terminal controllers. If each user agent 76 was separately registered on behalf of its associated graphical terminal 42, a separate port would required for each terminal controller 66.

The call control system 78 handles incoming and outgoing connections for its associated terminal 42 and manages all active connections. It gets information on the incoming messages from the user agent 76 and provides information on user responses back to the user agent. The call control system 78 also generates service requests and sends them to the graphical server 50 to get a URL (Uniform Resource Locator) for an appropriate FLASH page displaying the desired remote interface screen.

For example, if an alarm condition was detected by a SIP based alarm system, the alarm could initiate a SIP connection with a terminal 42. The call control system 78 would generate a request to "show alarm". The graphical server 50 then would return the URL of the FLASH page with the display for an alarm. The incoming alarm FLASH page could include multiple graphical elements, but would not include specific text relevant to the current alarm. The call control system 78 assembles the URL and the data that has to be filled in the FLASH page such as the reason for the alarm and the time of the alarm in the form of XML message and passes it to the presentation manager 80. The FLASH client 70 on the associated terminal 42 has a built in XML parser 71; it loads the FLASH page from the given URL and fills the fields with the data provided in the XML message. The call control system 78 also receives GUI response messages from the terminal 42 through the presentation manager 80 and invokes the translator 64 to parse the XML messages and translate them to JAVA objects that can be used by the call control system 78. The call control system 78 also sends RTP setup and RTP tear down messages to the RTP controller 84 (See FIG. 8) through FLASH on the terminal. RTP setup message is sent when the call setup is complete and the terminal has to set up RTP session with the remote party to start sending/receiving media. Similarly RTP tear down message is sent to the terminal if the user at the terminal or the remote party ends the call.

The presentation manager 80 manages the display of its associated terminal 42. The terminal 42 could support several simultaneous remote windows; in other words a single terminal can handle more than one active remote function at a time. The presentation manager 80 maintains individual folders for different remote sessions. The presentation manager 80 decides where to display this graphical representation. In a preferred embodiment, the presentation manager 80 communicates with the graphical client 70 in FLASH through XML sockets.

Referring again to FIG. 6, the translator 64 translates the GUI response messages (indicating user actions, such as pressing a button or icon) coming from the terminal 42 in XML format to JAVA objects and translates JAVA objects to XML messages that have to be sent to the terminal 42. This two way mapping between JAVA and XML may be done using JAVA Architecture for XML Binding (JAXB). JAXB compiles an XML schema into one or more JAVA technology classes. The combination of the schema derived classes and the binding framework enables to perform the following operations on an XML document:

unmarshal XML content into a JAVA representation. This JAVA representation can then be used by call control system to extract the information from the XML message;

access, update and validate the JAVA representation against schema constraint;

marshal the JAVA representation of the XML content into XML content. This is used by the call control system to generate XML messages that are sent to the user terminal.

The graphical server 50 generates the GUI for the terminals 42. For each associated terminal 42, the graphical server queries the database 68 to get the display capabilities of the terminal, such as size of the screen, depth of color etc. These capabilities are provided to the terminal manager 60 by the terminal 42 at the time of registration and stored in the database 68. When the graphical server 50 receives a request for a GUI, it customizes the GUI to the capabilities of the particular terminal. The graphical server 50 includes a GUI generator 56 and a GUI customizer 58.

The GUI generator 56 stores a stack of static FLASH pages. The request parser 54 parses the service requests coming from the terminal controllers 66. Based on the particular service request, the GUI generator returns an appropriate FLASH page URL to the requesting terminal controller 66.

The GUI customizer 58 customizes a selected FLASH page based on the capabilities of the particular graphical terminal 42.

The graphical proxy 12 uses the database 68 (which could be part of the graphical proxy 12 or a separate device) to store user related information. The information stored in the database 68 includes: (1) user name and password of registered users, (2) display capabilities of different terminals such as size of the screen color depth an so on, (3) remote setup information for the interfaces for each individual screen, (4) telephony information, if the terminal supports telephony functions.

Figure 8:
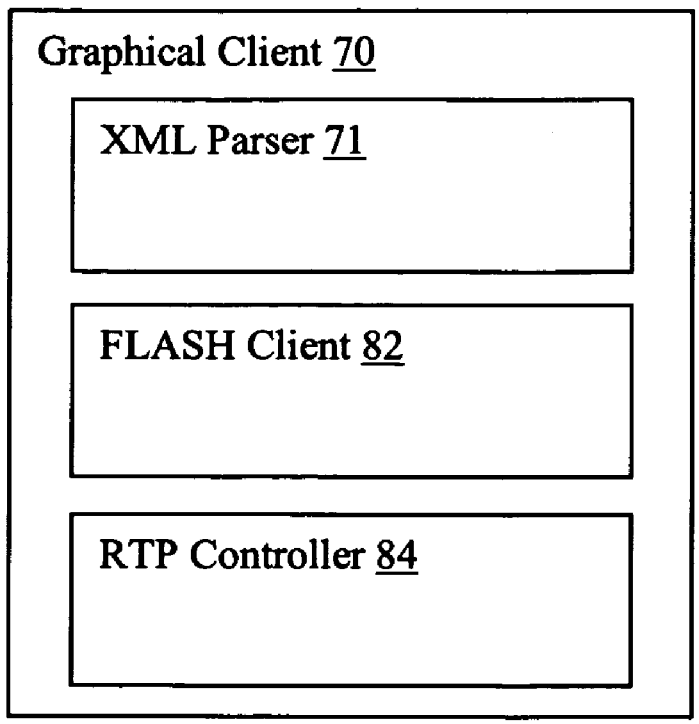
FIG. 8 illustrates a block diagram of the graphical client used in the remotes.

A graphical client application 70 runs on each terminal 42. FIG. 8 illustrates a block diagram of the graphical client 70. In additions to the XML parser 71, the graphical client 70 includes: (1) A FLASH client 82 to establish a TCP/IP connection with the graphical proxy 12 and for loading the login FLASH page from the graphical server 50 and (2) an RTP controller 84 responsible for setting up and tearing down the RTP session between the terminal 42 connected to the graphical proxy 12 and a remote party terminal. The RTP controller is only necessary if voice commands or voice communications are supported. The RTP session has to be set up by the terminal because media does not go through the graphical proxy. Since the call set-up and tear down is controlled by the graphical proxy 12, the graphical proxy sends messages to the RTP controller 82 on the terminal 42 regarding when to set up and break down the RTP session along with the required parameters.

In an enhanced embodiment, the graphical server can control content to a user device as well. For example, the graphical server could control communications between a media server with recorded television programs or movies and a device 17, responsive to user interaction with the remote. Hence, the remote could control devices that are not within a premise controlled by the user.

The present invention provides significant advantages over the prior art. A single device can be used for controlling multiple devices, regardless of the location of the devices. Further, a user can know the state of various appliances regardless of his or her location. Alarms can be set up to inform the user if about any state that is not normal.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A remote control system comprising:
   a mobile communication device for communicating over the Internet via a wireless network, the mobile communication device having a display;
   a graphical proxy server coupled to the Internet and in communication with the mobile communication device for:
      generating user interfaces for the mobile communication device for controlling various devices, wherein the graphical proxy server generates a web page with a graphical interface designed for interaction with at least one of the various devices responsive to a user indicating a desire for interaction with the at least one of the various devices from the mobile communication device, the graphical proxy server further sending a message to the wireless communication device indicating a universal resource locator (URL) for the web page;
      sending messages over the Internet to control the at least one of the various devices responsive to messages from the mobile communication device corresponding to user interaction with the web page.

2. The remote control system of claim 1 wherein graphical proxy server sends Session Initiation Protocol (SIP) messages to control various devices.

3. The remote control system of claim 2 and further comprising circuitry for generating an infra-red signal responsive to a SIP message.

4. The remote control system of claim 2 and further comprising circuitry for generating an radio frequency signal responsive to a SIP message.

5. The remote control system of claim 1 and further comprising a router to route the messages from the graphical proxy server to the various devices.

6. The remote control system of claim 1 wherein the mobile communication device is a mobile phone and the wireless network is a cellular network.

7. The remote control system of claim 1 wherein the mobile communication device is a personal computer.

8. The remote control system of claim 1 wherein the mobile communication device is a mobile computing device.

9. The remote control system of claim 1 wherein the wireless network is a cellular network.

10. A method of remote control using a mobile communication device coupled to the Internet via a wireless network, comprising the steps of:
 receiving remote control commands from the mobile communication device in a graphical proxy server coupled to the Internet and in communication with the mobile communication device, wherein the commands indicates a request to interface with a controlled device;
 generating user interfaces for execution in the mobile communication device in the graphical proxy server responsive to the commands, wherein the graphical proxy server generates a web page with a graphical interface designed for interaction with the controlled device, the graphical proxy server further sending a message to the wireless communication device indicating a universal resource locator (URL) for the web page;
 sending messages from the graphical proxy server over the Internet to control the controlled device responsive to interaction with the graphical user interface on the mobile communication device.

11. The method of claim 10 wherein step of sending messages comprises the step of sending graphical proxy server sends Session Initiation Protocol (SIP) messages to control the controlled device.

12. The method of claim 11 and further comprising the step of generating an infra-red signal responsive to a SIP message.

13. The method of claim 11 and further comprising the step of generating an radio frequency signal responsive to a SIP message.

14. The method of claim 10 and further comprising the step of routing the messages from the graphical proxy server to the controlled device.

15. The method of claim 10 and wherein the mobile communication device is a mobile phone and the wireless network is a cellular network.

* * * * *